Figure 1:
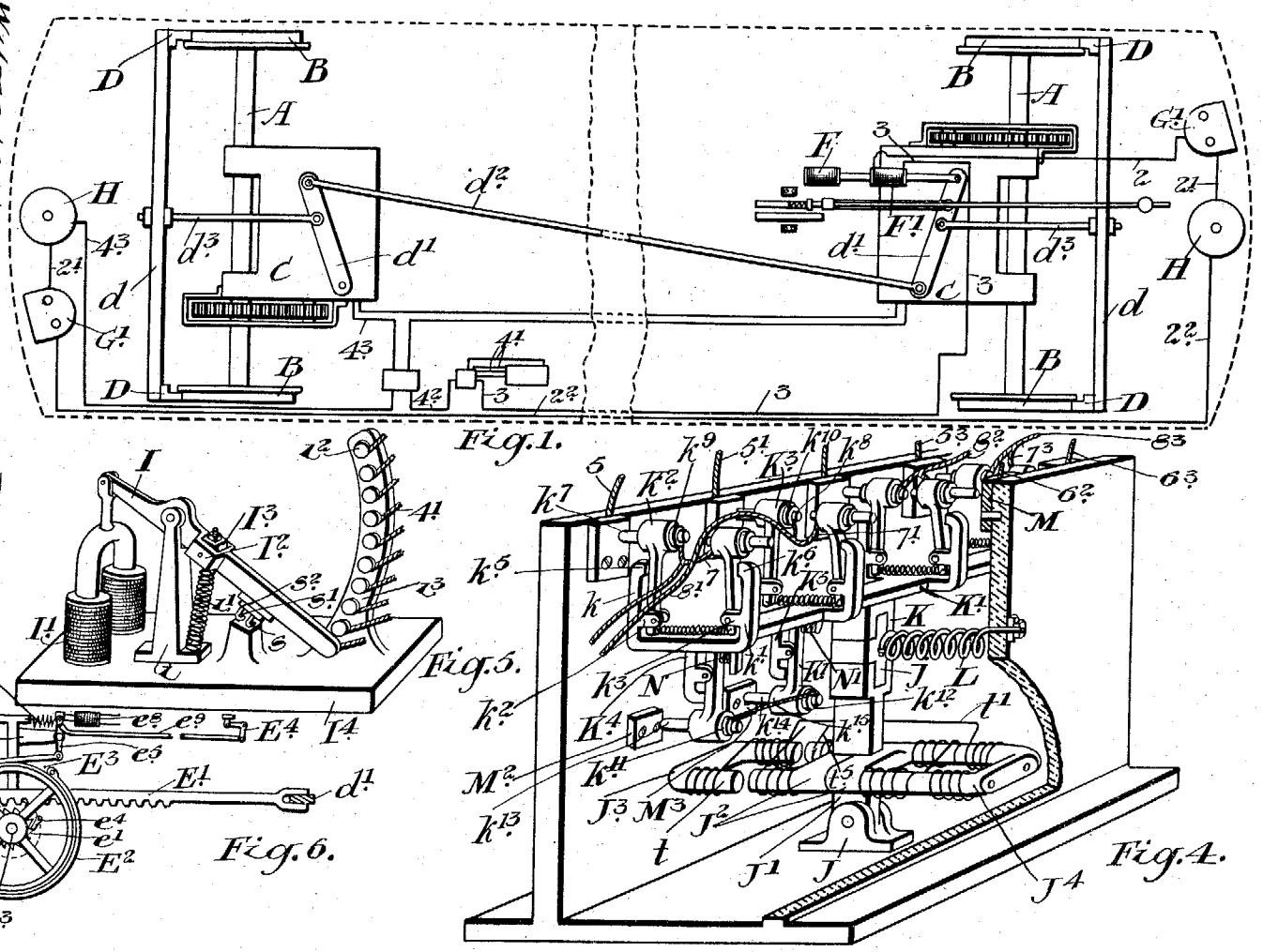

No. 12,510. REISSUED JULY 24, 1906.

J. H. K. McCOLLUM.

ELECTRIC CONTROLLING DEVICE FOR CARS.

APPLICATION FILED JUNE 18, 1906.

6 SHEETS—SHEET 1.

Witnesses.
H. S. Young
Edgar M. Huppard

Inventor
J. H. K. McCollum.
by Fred. D. Fetterstonhaugh
Atty

No. 12,510

REISSUED JULY 24, 1906.

J. H. K. McCOLLUM.

ELECTRIC CONTROLLING DEVICE FOR CARS

APPLICATION FILED JUNE 18, 1906.

6 SHEETS—SHEET 2.

Witnesses.
H. J. S. Young
Edgar M. Shepard

Inventor:
J. H. K. McCollum
by
Fred D. Fetherstonhaugh Atty.

No. 12,510. REISSUED JULY 24, 1906.

J. H. K. McCOLLUM.

ELECTRIC CONTROLLING DEVICE FOR CARS.

APPLICATION FILED JUNE 18, 1906.

6 SHEETS—SHEET 3.

Witnesses.
H. S. Young
Edgar M. Sheppard

Inventor.
J. H. K. McCollum,
by Fred S. Fetherstonhaugh
Atty.

No. 12,510. REISSUED JULY 24, 1906.

J. H. K. McCOLLUM.

ELECTRIC CONTROLLING DEVICE FOR CARS.

APPLICATION FILED JUNE 18, 1906.

6 SHEETS—SHEET 4.

Witnesses.
H. S. Young
Edgar W. Shepard

Inventor
J. H. K. McCollum.
by Fred B. Fetherstonhaugh
Atty.

No. 12,510. REISSUED JULY 24, 1906.

J. H. K. McCOLLUM.

ELECTRIC CONTROLLING DEVICE FOR CARS.

APPLICATION FILED JUNE 18, 1906.

6 SHEETS—SHEET 5.

Witnesses.
H. J. S. Young
Edgar M. Shepard

Inventor:
J. H. K. McCollum.
by Fred. D. Lederlunkauf
Atty

No. 12,510. REISSUED JULY 24, 1906.
J. H. K. McCOLLUM.
ELECTRIC CONTROLLING DEVICE FOR CARS.
APPLICATION FILED JUNE 18, 1906.
6 SHEETS—SHEET 6.
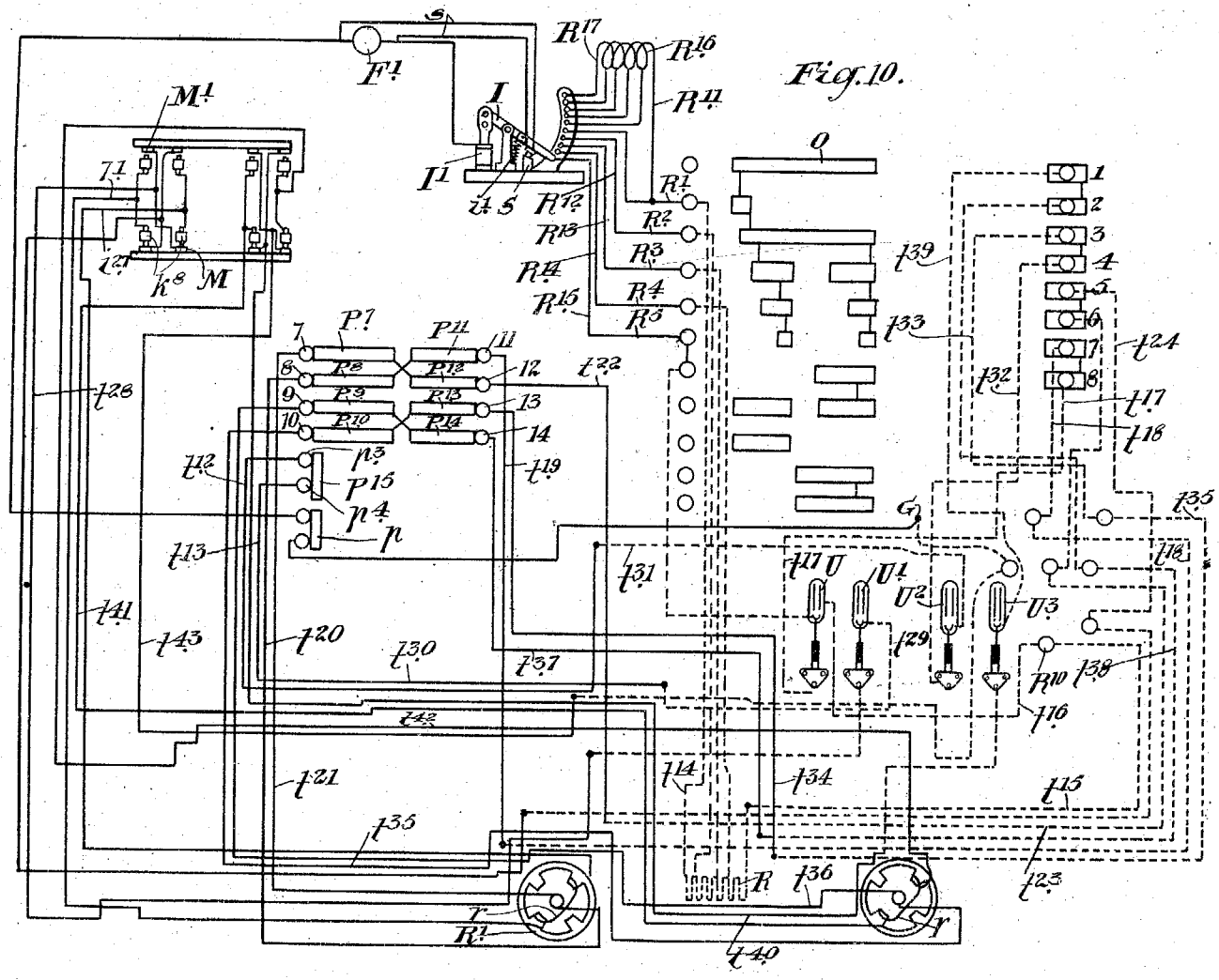
Witnesses.
H. Y. S. Young
Edgar M. Duckard
Inventor.
J. H. K. McCollum
by Fred D. Wheelwright
Atty.

UNITED STATES PATENT OFFICE.

JAMES HARRY KEIGHLY McCOLLUM, OF TORONTO, CANADA.

ELECTRIC CONTROLLING DEVICE FOR CARS.

No. 12,510. Specification of Reissued Letters Patent. Reissued July 24, 1906.

Original No. 817,264, dated April 10, 1906. Application for reissue filed June 18, 1906. Serial No. 322,347.

*To all whom it may concern:*

Be it known that I, JAMES HARRY KEIGHLY McCOLLUM, of the city of Toronto, in the county of York, in the Province of Ontario, Canada, have invented an Improvement in Electric Controlling Devices for Cars, of which the following is the specification.

My invention relates to improvements in electric controlling devices for cars; and the object of the invention is to devise a means whereby the car may be started with a minimum absorption of electric energy by the ordinary resistance, in which the speed of the car may be increased, utilizing the motors at present in use and with a greater starting torque than at present, in which the car may be slowed or stopped, and in so slowing or stopping convert its momentum into electric energy and feed such energy into the main line, and thus effect an economy at the generating-station, whereby in the utilization of my means the skidding of the wheels will be absolutely avoided and whereby in the utilization of my invention the car may be stopped on the level or on a grade and held.

To carry out these objects, I have constructed and arranged a special form of apparatus consisting of a controller, automatic apparatus for reversing the relation of the field to the armature, an automatic current-regulator, an electromagnetic brake-shoe-applying device, an electric and mechanically-controlled holdfast for the brake, all as hereinafter more particularly described, and set forth in the accompanying drawings, forming part of this specification.

Figure 2:
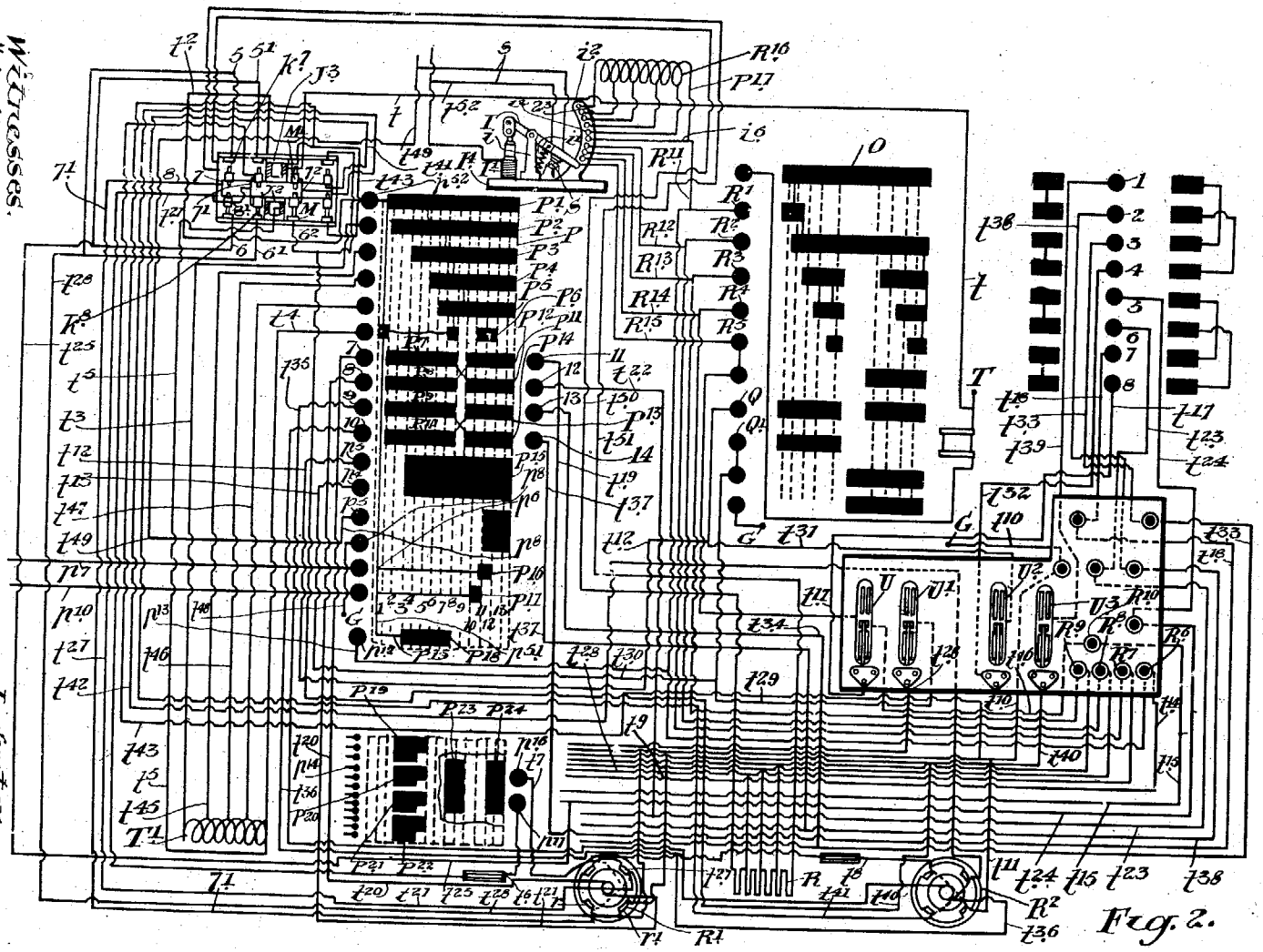
Figure 3:
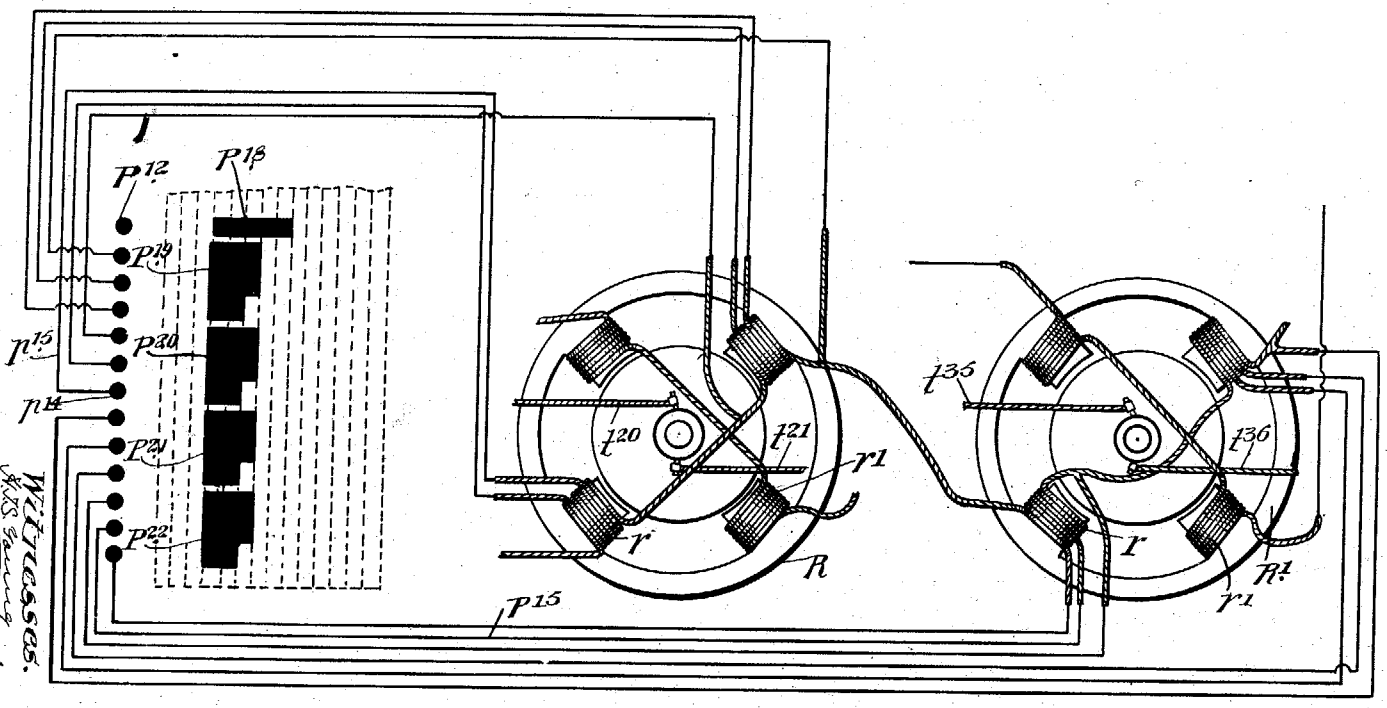
Figure 7:
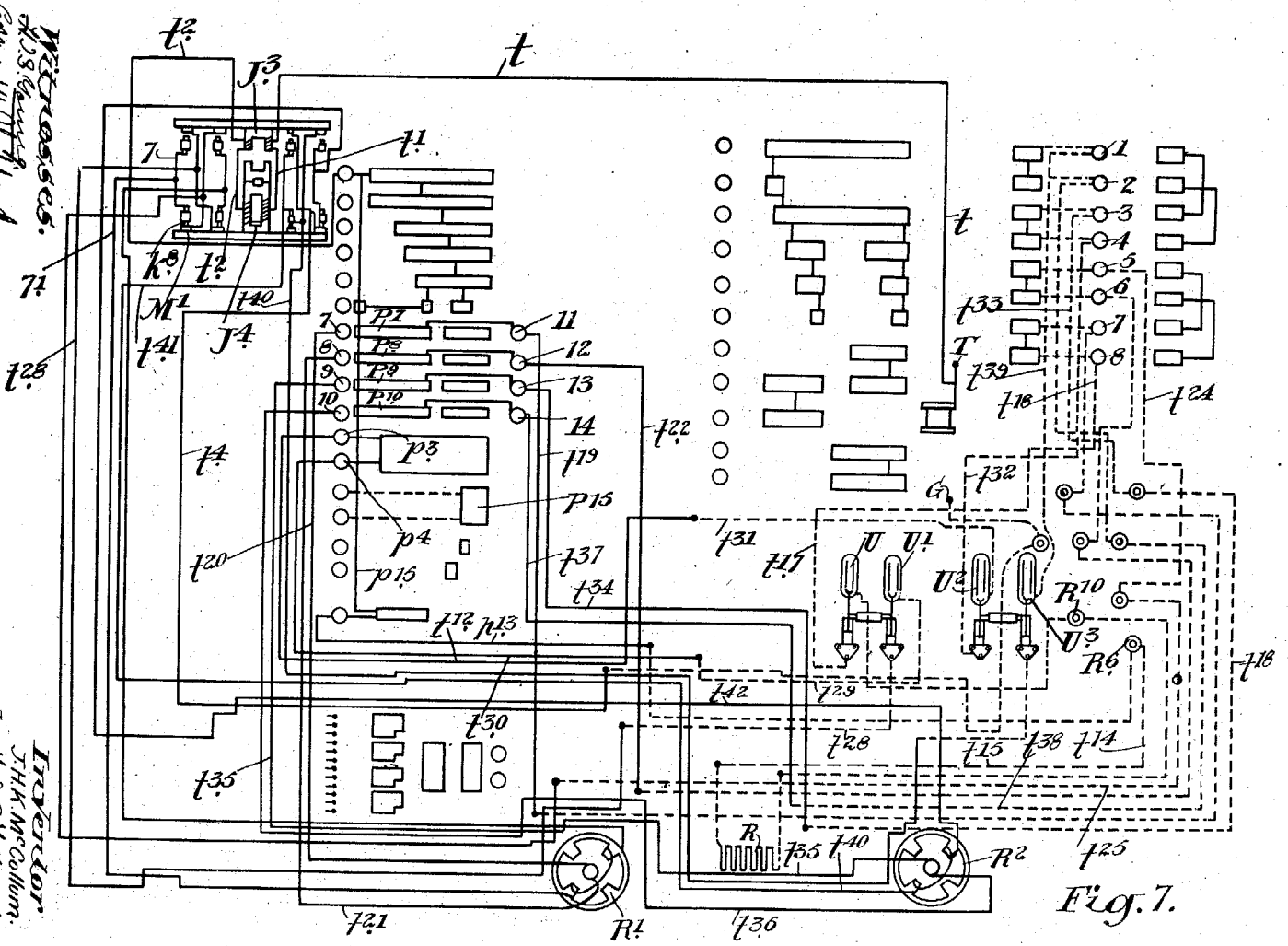
Figure 8:
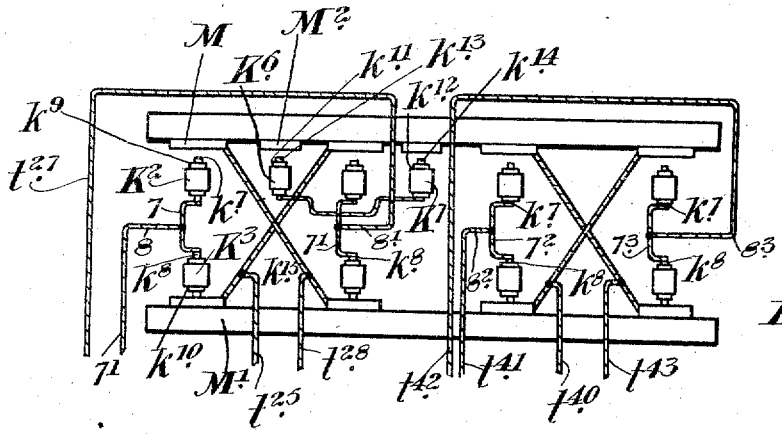
Figure 9:
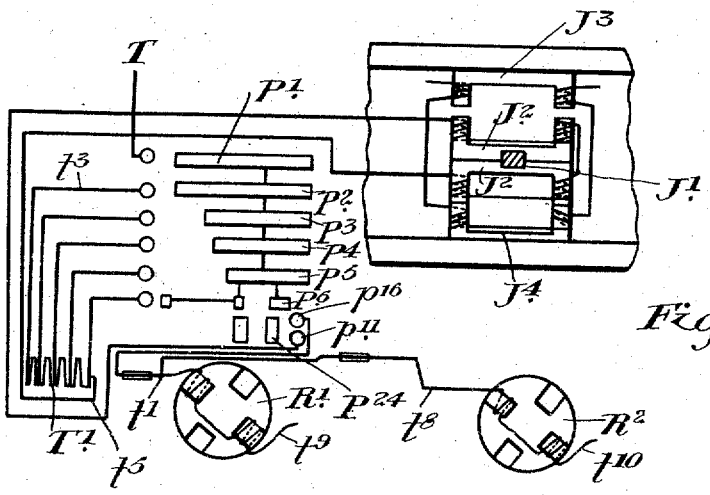

Figure 1 is a plan view showing a car in dotted outline, the wheels, axles, and motors and brake-controlling device and diagrammatically one arrangement of the various devices utilized in carrying out my invention. Fig. 2 is a diagrammatic view showing the various parts and the wiring connecting the same. Fig. 3 is a view showing my means of connecting portion of the controller to the fields of the motor. Fig. 4 is a perspective view, partially broken away, showing an automatic apparatus for changing the relation of the armature to the fields of the motors. Fig. 5 is a perspective detail of the automatic current-regulator. Fig. 6 is a perspective detail of the brake-holdfast device. Fig. 7 is a diagrammatic view showing the ordinary series circuit and connections to and through my auxiliary controller, the portion of the ordinary wiring of the car which I use in connection with my system being shown in dotted lines. Fig. 8 is a plan view showing all the top contacts and connections to same in my automatic field reversing apparatus shown in Fig. 4. Fig. 9 is a diagrammatic view of the shunt-circuit, showing the connections to the central magnet of the actuating-magnets of the field reversing apparatus shown in Fig. 4. Fig. 10 is a view showing a chart of the circuits.

In the drawings like characters of reference indicate corresponding parts in each figure.

In Fig. 1 I show by dotted lines intermediately broken away the outline of the bottom of the car or car-body.

A represents the axles, B the wheels, and C the motors, which are swung on the axle in the usual way and suitably geared to the same.

D represents the brake-shoes; $d$, the brake-beams; $d'$, the brake-levers; $d^2$, the connecting-rods between the brake-levers, and $d^3$ the rods connecting the brake-levers to the brake-beam.

E is the holdfast device, which comprises a wheel $e$, suitably supported and journaled at the bottom of the car and provided with a ratchet-wheel $e'$, attached thereto.

$e^2$ is a gear-wheel loose on the shaft $e^3$, and $e^4$ is a pawl engaging with the ratchet-wheel $e$.

E′ is a rack meshing with the gear-wheel $e^2$ and connected at the opposite end to the brake-lever $d'$.

$E^2$ is a brake-band extending around the wheel $e$ and connected at one end to the bracket $E^3$ and at the opposite end to the lever $e^5$, pivoted on the bracket $e^6$, attached to the frame.

$e^7$ is a spring connecting the upper end of the lever to the bracket $e^6$.

$e^8$ is a solenoid having the plunger thereof connected to the upper end of the lever $e^5$.

$e^9$ is a rod connected to a bell-crank $E^4$, which extends through the platform of the car and may be operated by the motorman.

The solenoid is connected to an independent circuit, as hereinafter described, and is designed to release the brake-band, the spring $e^7$ being designed to always hold the brake-band $E^2$ engaged with the wheel $e$.

By the motorman utilizing the bell-crank $E^4$ the brake-band may be also released, so as to release the brake.

The brake-levers are operated electrically through the solenoids F and F′. Either one or two solenoids may be employed; but if two are employed one may be in the shunt and the other in the local circuit.

G′ is the ordinary controller, and H is my auxiliary controller, which I show in a separate casing; but of course it will be understood that both controllers may be inclosed by one casing.

2 is a cable leading from the controller G′ to the solenoid F′, and 3 is a cable leading from the solenoid to the regulator.

2′ is a cable leading from the controller G′ to the controller H, and $2^2$ is a wire leading from the controller H to the controller G′ at each end of the car.

4′ represents a series of wires or cables leading from the regulator to the resistance.

$4^2$ is a wire leading from the regulator through the field reversing apparatus to the motor, and $4^3$ is a cable leading from the controller H at the opposite end of the car through the field reversing apparatus to the motor. The arrangement of the cable shown in Fig. 1 generally is not a definite or positive arrangement, but may be varied as the construction may admit of, and I only show the diagrammatic arrangement for the purpose of illustration, the preferable arrangement being shown in detail in Fig. 2 diagrammatically.

In Fig. 5 I show my preferred form of automatic regulator, which consists of a lever I, pivoted on a standard $i$ and having one end connected to a solenoid I′, which is also in the local circuit, as hereinafter referred to. The opposite end of the lever I has pivoted within a socket $I^2$ a swivel-block $I^3$, which is connected by a spring $i'$ to the base of the standard, such spring being designed to hold the extremity of this end of the lever down against the lowermost contact of the series of contacts $i^2$, which are arranged on the quadrantal-shaped bracket $i^3$, made of insulating material and secured to the base $I^4$, which would be preferably made of wood or other suitable material 4′ represents a series of wires leading from the contacts $i^2$ to the ordinary resistance, which is utilized on every motor-car, and an auxiliary resistance, which I may have to use, as will hereinafter appear.

In Fig. 4 I show a perspective view, with portion of the side broken away, of my field reversing apparatus, which may of course with equal facility be applied to reversing the direction of the current through the armature; but I preferably utilize such reversing apparatus in connection with the field. J is a bracket secured at the bottom of the box of the reversing apparatus, and J′ is a lever pivoted between the jaws of the bracket J and having secured to it at the bottom the reversely-set electromagnets $J^2$, which are directly opposite the electromagnets $J^3$ and $J^4$, secured to the sides of the box, as indicated. The coils of the electromagnets $J^2$ are in the shunt-circuit of the motor, as hereinafter referred to. The coils of the stationary magnets $J^3$ and $J^4$ are located in the ordinary circuit of the car. The upper end of the lever J′ is forked and has inserted in the fork an insulating-block $j$, which fits at the top in a fork K, located, preferably, in the center of the longitudinal plate K′. The plate K′ has attached to or forming part of it the side standards $k$ and $k'$, having the bearing-lugs $k^2$ and $k^3$, respectively, in which are pivoted the arms $K^2$ and $K^3$, connected together at the bottom by the spiral springs $k^4$. The tops of the standards $k$ and $k'$ are provided with stops $k^5$ and $k^6$, which limit the outward throw of the arms. The upper ends of the arms $K^2$ and $K^3$ are made in ring form and carry contact-rods $k^7$ and $k^8$, respectively, which are insulated from the upper end of the arms by the sleeves $k^9$ and $k^{10}$. The lever J′ is connected by a spiral spring L to the side of the box, as indicated, such spring being designed to hold the contact-rods $k^8$ normally against the plates M, the other contact-rods $K^7$ being held away from the contact-plates M′. All plates M and M′ are secured to the sides of the box, which is of insulating material, and wires 5 5′ $5^2$ $5^3$ on one side and the wires 6 6′ $6^2$ $6^3$ on the other side lead from such plates M M′, as hereinafter shown and described in reference to Fig. 2. Each pair of contact-rods $k^7$ and $k^8$ are connected together, starting at one end by wires 7 7′ $7^2$ $7^3$, from which extend wires 8 8′ $8^2$ $8^3$, which lead as hereinafter described in reference to Fig. 2. $K^4$ and $K^5$ are stems which are attached to or form part of the bar K. Upon offsets on the stems $K^4$ and $K^5$ are pivoted the arms $K^6$ and $K^7$, which have ring-shaped ends through which extend the insulating-sleeves $k^{11}$ and $k^{12}$, in which are held the contact-rods $k^{13}$ and $k^{14}$, respectively. $M^2$ and $M^3$ are contact-plates secured to the side of the case or box. These plates are connected by wires to the ordinary resistance, as hereinafter described. The contact-rods $k^{13}$ and $k^{14}$ are connected together by a wire $k^{15}$, as indicated. N N′ are springs extending between the upper ends of the arms $K^6$ and $K^7$ and lugs forming part of the plate K. The object of the springs is to insure of an even pressure and the contact of both contact-rods $k^{13}$ and $k^{14}$. The springs $k^4$, hereinbefore described in reference to the arms $K^3$ and $K^4$, are for a similar purpose. All the contact-rods $k^7$ are normally held away from the contact-plates M by means of the spring L, and this is a predetermined arrangement, so that I am enabled to start the car as under ordinary conditions, as will hereinafter appear.

I shall now refer to Fig. 2, which shows a diagrammatic view of the several controllers, the motors, the automatic regulator, and the field reversing apparatus, the resistances, and the wiring of the same. O represents the contact-plates of the main roll of the ordinary controller, and T is the trolley connection. $R'$, $R^2$, $R^3$, $R^4$, and $R^5$ are the several connections to the resistance, which lead to the binding-posts $R^6$, $R^7$, $R^8$, $R^9$, and $R^{10}$, respectively; thence to the resistances R. Branch wires $R^{11}$, $R^{12}$, $R^{13}$, $R^{14}$, and $R^{15}$ lead to the lowermost contacts $i^2$ of the automatic regulator. An extra resistance $R^{16}$ is provided in order to keep the current down to the proper amperage should the motorman throw the brake-controller far enough around to form the local circuit when the car is going at a high speed, and this resistance is connected by wires $R^{17}$ to the uppermost wire $i^6$ of the automatic regulator. The wires $s$ extend from the short-circuiting block S to the solenoid $F'$, such short-circuiting taking place only when the lever I is down and such short-circuiting being designed so as to short-circuit the solenoid $F'$, and thereby have as little resistance in the local circuit as possible, so that the car may be stopped readily by the machines acting as generators when their voltage is at a minimum on account of their slow speed. The automatic regulator is preferably placed in the local circuit between the ground G and the fingers $R'$, $R^2$, $R^3$, $R^4$, and $R^5$ of the controller. The solenoid $I'$ of the automatic regulator is operated by being in the local circuit. The pull of the solenoid throws the opposite end of the lever over the several contacts $i^2$ in rotation, starting from its normal position at the bottom, thereby throwing in several resistances, the spring $i'$ serving to regulate the extent of the movement of the lever, and consequently the amount of current which passes through the local circuit. The spring $i'$ of course is so set as to regulate the current in the local circuit so that the maximum braking effect may be arrived at without skidding. While still speaking of the local circuit, I may mention that I provide an auxiliary controller P, which is provided with contact-fingers $p^{52}$, as set forth diagrammatically in Fig. 2, and until the plates $p'$ $p^2$ touch the fingers $p^{52}$ the local circuit is incomplete and inoperative. Of course the roll in the auxiliary controller is of a similar type to the ordinary controller, although the contacts and fingers are arranged differently for other purposes. My auxiliary controller is used in running the car as well as in stopping the car, and consists of the plates $P'$, $P^2$, $P^3$, $P^4$, and $P^5$ and row of plates $P^6$, which, with the fingers opposite them, are used to form my independent shunt-circuit and throw in and out the resistance. On the plate $P'$ contacting with its finger and the first one of the row of plates $P^6$ contacting with its finger, my independent shunt-circuit through the motors is thrown in, but with no resistance. The plate $P^2$ also contacts simultaneously with its finger, and the resistance will not come into the shunt-circuit until the first plate $P^6$ brakes with its finger. The following plates $P^3$, $P^4$, and $P^5$ then gradually cut out the shunt resistance as they contact with their fingers in succession. When the finger leaves the second plate $P^6$, the shunt-circuit is broken, and when it reaches the third plate $P^6$ distant from its finger the shunt-circuit is thrown in connection, as will hereinafter appear. In order to understand the operation of my auxiliary controller, I shall describe the operation of the same notch by notch as the plates pass under the fingers, and in this connection I shall also describe the wiring of my controller. The notches of my auxiliary controller P, I number in the ordinary way used in practice—"1," "2," "3," "4," "5," "6," "7," "8," "9", "10," "11," "12," and "13." $P^7$ $P^8$ $P^9$ $P^{10}$ are one set of plates on the roll of the controller, and $p^{11}$, $p^{12}$, $p^{13}$, and $p^{14}$ are sets of plates separated from the aforesaid plates, but located directly opposite to them. The plate $P^7$ is connected by a wire to the plate $P^{12}$, and the plate $P^8$ to the plate $P^{11}$, the plate $P^9$ to the plate $P^{14}$, and the plate $P^{10}$ to the plate $P^{13}$. The plates $P^7$ to $P^{14}$ are utilized with the fingers 7 8 9 10 on one side and 11, 12, 13, and 14 on the opposite side and their wire connections, hereinafter described, to reverse the armature terminals, as will hereinafter appear. $P^{15}$ is a plate on the roll designed to complete the circuit between the trolley and the ground when the ordinary controller is off—that is to say, when the circuit is incomplete in the controller between the fingers Q and $Q'$. The coacting fingers $p^3$ and $p^4$ are connected by wires directly to the fingers Q and $Q'$ of the ordinary controller in order to effect this purpose. $P^{16}$ is a plate on the roll connected to the main wire $p^{57}$, and $p^6$ is a finger connected to the wire $p'$, leading to the solenoid F. The other finger $p^8$ leads to the ground. $P^{17}$ is a contact-plate connected to the wire $p^5$ of the roll, and $p^9$ is a finger which is connected by a wire $p^{10}$ to the solenoid, but from which the wire $p^{11}$ extends to the ground. $P^{18}$ is a contact-plate connected to the main wire $p^{57}$ of the roll, and $p^{12}$ is a finger designed to coact with the plate $P^{18}$ and connected by a wire $p^{13}$ into the regular circuit, which now passes not only through its regular course, commonly known, but also through the armature-plates $P^7$ to $P^{14}$, plate $P^{15}$ of my auxiliary controller, and through the field reversing apparatus. $P^{19}$, $P^{20}$, $P^{21}$, and $P^{22}$ are contact-plates on the roll of my auxiliary controller, which coacts with the several fingers $p^{14}$, which are connected by wires $p^{15}$ to the series fields $r$ of the motors $R^2$, the diagrammatic view of which is shown in Fig. 3 and not in Fig. 2, where the insertion would make the drawing too complex. The coaction of the plates and fingers aforesaid serves to short-circuit the major portion of the series fields when the feeding of the current to the trolley-wire is first taking place by the conversion of the momentum of the car into electric energy—that is, when the motors are starting to act as generators. Later on when the car is coming to a standstill the fields are thrown in by the coaction of these plates and fingers aforesaid. The object of this arrangement of plates and fingers is to effect a gradual stop of the car—that is, without sudden jars or jolts. I provide also, preferably in my motors, in addition to the series fields $r$, the shunt-fields $r'$, which are in an independent or shunt circuit, the course of which is hereinafter described. The shunt-circuit, above referred to used in my apparatus is designed to magnetize the fields during the period that no current is passing through the series fields or during the period that the reversing of the current through the fields is taking place. It may be possible in practice that I may not find it necessary to use a shunt-circuit, as the fields may hold their magnetism long enough to effect the reversal of the current without having such a means as I describe provided. Of course the manner of arranging the shunt and series coils in the field may be varied without departing from the spirit of my invention. The preferable way to arrange the series and shunt coils would be to have each pole of the field have a winding, partially series and partially shunt. On the roll of my auxiliary controller I provide contact-plates $P^{23}$ and $P^{24}$, which coact with the fingers $p^{16}$ and $p^{17}$ in the shunt-circuit in order to hold the shunt-circuit open during the period that the armature-terminals are being reversed—that is to say, during the period when the contact-plates $P^7$ to $P^{10}$ of my roll are braking with their coacting fingers 11, 12, 13, and 14 and plates $P^{11}$ to $P^{14}$ are connecting with the aforesaid fingers.

Having now clearly set forth the use of the several plates and fingers of my auxiliary controller, I shall proceed to describe the operation of the controller notch by notch, as hereinbefore referred to, bringing in the several circuits which I utilize. When the roll is moved to notch "1," starting at the trolley T, the current passes along the wire $t$ into the magnet $J^3$, (see Figs. 2 and 4,) along the wire $t'$ to the magnet $J^4$, then along the wire $t^2$ to the top finger of my auxiliary controller, thence to the top contact-plate $P'$ of the controller, and by a wire to the contact-plate $P^2$, where the current divides, part going through the second finger of the controller, then along the wire $t^3$ and through the shunt resistance $T'$, the remaining portion of the current passing by wire through the several contact-plates $P^3$, $P^4$, and $P^5$ and the central contact-plate $P^6$ and by wire to the contact-plate $P^6$, nearest the finger, thence by the contact-wire $t^4$ to the exit from the resistances, where the combined current passes along by a wire $t^5$ to and through the double magnet $J^2$, (see Fig. 4,) and then through the wire $t^6$ to the contact-finger $p^{17}$, thence by the contact-plate $P^{24}$ on another part of the roll to the finger $p^{16}$, thence to a point where the circuit divides, one wire $t^7$ passing to and through the shunt-fields of the motor $R'$ and the other wire $t^8$ passing to and through the shunt-field of the motor $R^2$. From the field of the motor $R'$ the circuit extends through the wires $t^9$ and $t^{10}$ to the ground G. The circuit extends from the fields of the motor $R^2$ through the wire $t^{11}$ to the wire $t^{10}$, thence to the ground. It will thus be seen that the motors are shown and described as in parallel, although they may be arranged in series as regards the shunt-field. It will thus be seen that by the arrangement I have shown a strong field is produced in starting the car before the current is turned on through the series fields and armatures to start the current. By such an arrangement as I have described above the strong field produced and continuing aids materially in enabling the ordinary resistance to be thrown rapidly, thus obviating undue absorption of energy in the ordinary resistances. I have now shown the circuit and the object of such circuit when my auxiliary controller is moved to the first notch. When the second notch is reached, the plate $P^6$ to the left breaks with its contacting finger and the current ceases to pass through the wire $t^4$, and thus all the current going through the shunt-circuit will pass through the wire $t^3$ and through the shunt resistance T and through the rest of the shunt-circuit, as hereinbefore described. When the third notch is reached, the contact-plate $P^{15}$ comes in contact with the fingers $p^3$ and $p^4$ and the contact-plate $P^{18}$ comes in contact with the finger $p^{12}$. The armature-plates $P^7$, $P^8$, $P^9$, and $P^{10}$ are of course at the same time in contact with their several fingers 7, 8, 9, and 10. Of course I may state that the plates $P^7$, $P^8$, $P^9$, and $P^{10}$ are always in contact with their respective fingers above recited, even though the controller is on the off position, as will be seen by the point to which the plates extend. The plates $P^7$, $P^8$, $P^9$, and $P^{10}$ are in contact with the fingers 11, 12, 13, and 14, also when the controller is in the off position and until the eighth notch is reached—that is, the notch opposite the end of the contact-plates $P^7$ $P^8$ $P^9$ $P^{10}$. The plate $P^{15}$, contacting with the fingers $P^3$ and $P^4$, serves to complete the series circuit through the wires $t^{12}$ and $t^{13}$ on account of its being broken between the fingers Q and $Q'$ when the ordinary controller is off. The contact-plate $P^{18}$ coming in contact with the finger $p^{12}$, as hereinbefore described, at the third notch the current, besides going through the shunt-circuit, already particularly set forth hereinbefore, passes through the wire $P^{19}$ and out through the wire $p^{13}$ along to the binding-post $R^6$, thence by wire $t^{14}$ to the resistance R, and through same and along the wire $t^{15}$ to the binding-post $R^{10}$, thence by wire $t^{16}$ and through the base controller-switch U and by wire $t^{17}$ to the bottom finger 8 of the reverse roll of the controller, which is set in the forward position across the contact-plates to the finger 7, thence by the wires $t^{18}$ and $t^{19}$ to the finger 11, plate $P^7$, finger 8 of the auxiliary controller, and by wire $t^{20}$ to the armature of the motor R′ and by wire $t^{21}$ to and through the finger 8 of the auxiliary controller, plate $P^8$ and finger 12 of the auxiliary controller, through the wire $t^{22}$, then by wire $t^{23}$ to the finger 6, across the contact-plate to the finger 5 of the reverse roll and out by wire $t^{24}$ and wire $t^{25}$ to the plate M at the right-hand side of the field reversing apparatus, across the contact-rod $k^8$, through the wires 7, to and through the series field of the motor R′, and in by wire $t^{27}$ to the second contact-finger $k^8$, from the left and out through the wire $t^{28}$ to the controller base-switch U′, thence by the wire $t^{29}$, along the wire $t^{30}$, to and through the fingers $p^4$ and $p^3$, connected by the plate $P^{15}$ of my auxiliary controller, and by wire $t^{31}$ to the ordinary controller base-switch $U^2$, and by wire $t^{32}$ to the finger 4 of the reverse roll, thence by the contact-plates to the finger 3, out by the wire $t^{33}$ and by wire $t^{34}$ to and through the finger 13, contact-plate $P^9$, finger 9 of the auxiliary controller, and by wire $t^{35}$ to the armature of the motor $R^2$, and out by the wire $t^{36}$ to the finger 10, plate $P^{10}$, finger 14, and wire $t^{37}$, wire $t^{38}$ to finger 2 of the reverse roll by fingers 1 and wire $t^{39}$, to the ordinary controller base-switch $U^3$, thence by wire $t^{40}$ to the third plate M, from the left of the field reversing apparatus, through the contacting contact-rod $k^8$ third from the left, then by the wire $t^{41}$ to the series field, to and through the series fields of the motor $R^2$, then by wire $t^{42}$ to the contact-rod $k^8$ at the extreme right of the field reversing apparatus, through corresponding plate M, and by wire $t^{43}$ to the ground G. While the controller is at the third notch the plates $P^{19}$, $P^{20}$, $P^{21}$, and $P^{22}$ are contacting with their corresponding fingers $p^{14}$, and the greater portion of the series fields are thereby short-circuited, as will be readily un stood by those familiar with the art. When notch 4 of my auxiliary controller is reached, the contact-plate $P^3$ being in contact with its corresponding finger, the first section of the shunt-resistance is short-circuited by reason of the current passing through the wire $t^{45}$. When notch 5 is reached, the plate $P^4$, contacting with its corresponding finger, short-circuits sections 1 and 2 of the shunt-resistances, as the current then passes down through the wire $t^{46}$. When notch 6 is reached, the contact-plate $P^5$ and its corresponding finger short-circuit section 3 of the shunt-resistance T′, as the current then passes down through the wire $t^{47}$.

At the same time the plates $P^{19}$ $P^{20}$ $P^{21}$ $P^{22}$, being shorter at one portion than the other, pass off certain of the fingers $p^{14}$, and the conquence is that a portion of the series fields are thrown into series circuit for the purpose of further strengthening the magnetism of the motors. When notch 7 is reached, the intermediate plate $P^6$, contacting with its finger, short-circuits the whole of the shunt-resistance by means of the current passing through the wire $t^4$. The plates $P^{19}$ $P^{20}$ $P^{21}$ $P^{22}$, passing away from the fingers $p^{14}$, at the same time throw the whole series fields into the series circuit to give maximum strength to the magnetism of the motors. The shunt resistance T′ is also thrown out for the same purpose. When notch 8 is reached, the circuits are in the same condition as in notch 7, with the exception that the plate $P^{24}$ has just passed away from the fingers $p^{16}$ and $p^{17}$, so that the shunt-circuit will be broken before the plates $P^7$ $P^8$ $P^9$ $P^{10}$ leave their coacting fingers 11, 12, 13, and 14. During the period that my auxiliary controller is operating between the notches 3 and 8 the counter electromotive force being stronger than the voltage of the line the current is now fed from the motors, acting as generators, back into the line, thereby through the action of the magnets $J^3$ and $J^2$ (see Fig. 4) throwing the contact-rods $K^7$ into contact with the plates M and the contact-rods $k^8$ out of contact with the plates M, thus keeping the counter electromotive forces in the same direction, so that the current is being fed into the line constantly during the period that the controller is working between the aforesaid notches. At the same time the contact-rods $k^{13}$ strike the contact-plates $M^2$, thereby short-circuiting the main resistance R through the wires $t^{50}$ and $t^{51}$. (See Fig. 4.) In passing on to the notch 9 the contact between the intermediate plate $P^6$ and its corresponding finger is broken, and also the contact between the plate $P^{18}$ and its corresponding finger is broken, thus keeping the shunt-circuit broken and breaking the series circuit. The plates $P^{11}$, $P^{12}$, $P^{13}$, and $P^{14}$ now pass on to the fingers 11, 12, 13, and 14 subsequently to the plates $P^7$ $P^8$ $P^9$ $P^{10}$ having passed away from them, thus reversing the armature-terminals, and thereby cause the current to pass through the local circuit when formed in the proper direction to build up the residual magnetism in the fields of the motor and prevent their demagnetization. When notch 10 is reached, the final plate $P^6$ comes in contact with its respective finger and the plate $P^{23}$ comes in contact with fingers $p^{16}$ and $p^{17}$, thereby completing the shunt-circuit again, as hereinbefore described, and the plate $P^{17}$ contacts with its corresponding finger and the solenoid $e^8$ operates to release the band $E^2$, which has no present effect. When the notch 10 is reached, the shunt-circuit is still complete;

but in addition a local circuit is formed through the contact-plate $p$ contacting with the fingers $P^5$ and $P^8$, and such circuit passing by wire $t^{48}$ to the ground and by the wire $t^{49}$ to and through the spring-fingers $s$ $s'$, attached to the base of the automatic regulator and plate $s^2$, insulated from the arm I of the automatic regulator, thence by wire $t^{52}$ to and through the solenoid of the automatic regulator, thence to the standard $i$ and arm I, then into the lowermost contact $i^2$, thence by the wire $R^{15}$ to the ordinary controller and circuit, thus forming the local circuit. One branch of the wires $t^{49}$ and $t^{52}$ go to the brake-solenoid. It will now be seen that the automatic regulator would be thrown into operation, as hereinbefore described, as the motors now acting as generators will force a current through the local circuit, hereinbefore described. As the plates $s^3$ on the arm pass away from the fingers $s$ $s'$ the short circuits and the field-current of the local circuit pass into the brake-solenoid, thereby actuating the brake-lever $d$ and pulling up the shoes. While on the notch 11 the plate $P^{16}$, contacting with its corresponding finger, causes the current to pass to the shunt-solenoid F and through same to the ground. On notch 12 the conditions are just the same as to notch 11, instead of course that the circuit through the plate $P^{17}$ and its corresponding finger leading to the holdfast mechanism is broken. On notch 13 it will be seen that all the circuits are broken except the local circuit. The first notch of course is used when starting and running the car, as before described, and the succeeding notches are used for converting the momentum into electromagnetic energy and feeding back into line and forming the local circuit, which stop the car even when the pole is off the trolley-wire or the car off the track and for operating the holdfast putting on the brake. When in my auxiliary controller the roll is returned, the plate $P^{17}$, coacting with its corresponding finger, will again release the band $E^2$ of the holdfast, and thereby release the brake-shoes at the proper time.

Although I describe the shunt-solenoid and holdfast-solenoid as in separate circuits, it will of course be understood that without departing from the spirit of my invention I may put them in the main shunt-circuit.

Again, although I describe a certain arrangement of contact-plates and fingers in reference to the roll of my auxiliary controller it will also be understood that I may without departing from the spirit of my invention change the position, length, or width of the plates and fingers, as may be found most useful for the proper operation of my apparatus.

It will be understood that in order to insure an effective operation of my apparatus it is essential that the upper sets of contacts used in connection with the two sets of contact-plates in the apparatus for reversing the relation of the fields to the armature one set must make contact with its corresponding set of plates before the other set of contacts breaks with the corresponding set; otherwise the series circuit would be broken.

What I claim as my invention is—

1. In an electric controlling device for cars, in combination a compound-wound motor, a suitable controller, a variable resistance therefor, automatic means used in connection therewith for reversing the relation of the armature to the fields, means for short-circuiting the motors and a regulator located in the local or short circuit and designed to throw the resistance in or out of the local or short circuit, as and for the purpose specified.

2. In an electric controlling device for cars, in combination a compound-wound motor, a suitable controller, a variable resistance therefor, automatic means used in connection therewith for reversing the relation of the armature to the fields, means for short-circuiting the motor and an automatic regulator located in the local or short circuit and designed to throw the resistance in or out of the local or short circuit as and for the purpose specified.

3. In an electric controlling device for cars, in combination a compound-wound motor, a variable resistance therefor located in the shunt-circuit, a suitable controller, means for short-circuiting the fields of the motor, a regulator located in the local circuit, means for reversing the relation of the armature to the fields, means for forming a local or short circuit through the motors and a regulating apparatus for reversing the relation of the fields to the armature and the controller as and for the purpose specified.

4. In an electric controlling device for cars, in combination a compound-wound motor, a variable resistance therefor located in the shunt-circuit, a suitable controller, means for short circuiting the series fields of the motor, a regulator located in the local circuit, means for reversing the relation of the armature to the fields, means for forming a local or short circuit through the motors, a regulating apparatus for reversing the relation of the fields to the armature and the controller and an auxiliary controller provided with a set of fingers and contact-plates to throw in the shunt-circuit, a set of fingers and contact-plates to variably short-circuit the series fields and a set of fingers and contact-plates to complete the series circuit from the trolley to the ground, as and for the purpose specified.

5. In an apparatus of the class described, an auxiliary controller provided with a set of fingers and contact-plates to throw in the shunt-circuit, a set of fingers and contact-plates to variably short-circuit the series fields and a set of fingers and contact-plates to complete the series circuit from the trolley to the ground, as for the purpose specified.

6. In an electric controlling device for cars, in combination a compound-wound motor, a variable resistance therefor located in the shunt-circuit, a suitable controller, means for short-circuiting the fields of the motor, a regulator located in the local circuit, means for reversing the relation of the armature to the fields, means for forming a local or short circuit through the motors, a regulating apparatus for reversing the relation of the fields to the armature and the controller, and an auxiliary controller provided with a set of fingers and contact-plates to throw in the shunt-circuit, a set of fingers and contact-plates to variably short-circuit the series fields, a set of fingers and contact-plates to complete the series circuit from the trolley to the ground and a set of fingers and contact-plates to form a local or short circuit after the connection from the trolley has been broken as and for the purpose specified.

7. In an apparatus of the class described the combination with the brake-lever and rack connected to the same and pinion, ratchet-wheel and pawl and brake-wheel and band-releasing magnet as described, of an electric motor connected to the same and the auxiliary controller provided with a coacting finger and contact-plate for throwing the current in and out of the motor as and for the purpose specified.

8. In an apparatus of the class described, the combination with the brake-lever and holdfast device and motor for controlling such holdfast device, of the auxiliary controller provided with a finger and contact-plate for throwing the current in and out of the motor, as and for the purpose specified.

9. In an apparatus of the class described, an auxiliary controller provided with the coacting fingers and contact-plates located in the shunt-circuit and designed to open the same prior to the reversal of the armature-terminals and to close the shunt-circuit after the reversal of the armature-terminals as and for the purpose specified.

10. In an apparatus of the class described, an automatic regulator located in the local circuit comprising a series of contacts connected to the series circuit through a suitable resistance, a lever designed to have one end coact with the contacts, and solenoid located in the circuit and operating the opposite end and means for normally holding the lever raised at the solenoid end as and for the purpose specified.

11. In an electric controlling system for cars, in combination, a suitable controller, a brake-shoe-applying motor, a variable resistance therefor, said motor suitably attached to brake-shoe lever, means for supplying said motor with current from trolley-wire, means for reversing the relation of the armature to the fields of the main car-driving motors, means for forming a local circuit in car including controllers, motor or motors and an automatic resistance-regulator for said local circuit, a holdfast device locking the brake-shoes, as set by brake-shoe-applying motor, means for releasing the holdfast device, and brake-shoes, as and for the purpose specified.

12. In an electric controlling system for cars, in combination, a suitable controller, a double-wound brake-shoe-applying motor, a variable resistance therefor, said motor suitably attached to brake-shoe lever, means for supplying said motor with current from trolley-wire, means for reversing the relation of the armature to the fields of the main car-driving motors, means for forming a local circuit in car including controllers, motor or motors and an automatic resistance-regulator for said local circuit, a holdfast device locking the brake-shoes, as set by brake-shoe-applying motor, means for releasing the holdfast device, and brake-shoes, as and for the purpose specified.

13. In an apparatus of the class described, an automatic regulator located in the local circuit comprising a series of contacts connected to the series circuit through a suitable resistance, a lever designed to have one end coact with the contacts and solenoid located in the circuit and operating the opposite end and an adjustable spring connected to the opposite end of the lever and acting against the solenoid as and for the purpose specified.

14. In an apparatus of the class described, an automatic regulator located in the local circuit comprising a series of contact connected to the series circuit through a suitable resistance, a lever designed to have one end coact with the contacts and solenoid located in the circuit and operating the opposite end, means for normally holding the lever raised at the solenoid end, a contact-plate located on the lever and insulated from the same and coacting fingers located in the circuit of the brake-operating solenoid as and for the purpose specified.

15. In the apparatus described, a device for reversing the relation of the field to the armature comprising an arm suitably pivoted and provided with magnets located in the shunt-circuit, stationary coacting magnets located in the series circuit and designed to coact with the aforesaid magnets on the arm, a set of pairs of movable contacts supported on the upper end of the arm and insulated therefrom, coacting sets of contact-plates located in the series circuit and means for normally holding the arm, so that the contacts at one side are normally in contact with one set of stationary plates and the contacts on the opposite side out of contact with the opposite set of stationary plates as and for the purpose specified.

16. In the apparatus described, a device for reversing the relation of the field to the armature comprising an arm suitably pivoted and provided with magnets located in the shunt-circuit, stationary coacting magnets located in the series circuit and designed to coact with the aforesaid magnets on the arm, a set of pairs of movable contacts supported on the upper end of the arm and insulated therefrom, coacting sets of contact-plates located in the series circuit and a spring connected to the arm and to a suitable portion of the frame as and for the purpose specified.

17. In the apparatus described, a device for reversing the relation of the field to the armature comprising an arm suitably pivoted and provided with magnets located in the shunt-circuit, stationary coacting magnets located in the series circuit and designed to coact with the aforesaid magnets on the arm, a set of pairs of movable contacts supported on the upper end of the arm and insulated therefrom, coacting sets of contact-plates located in the series circuit, means for normally holding the arm, so that the contacts at one side are normally in contact with one set of stationary plates and the contacts on the opposite side out of contact with the opposite set of stationary plates, and a pair of movable contacts connected to and suitably insulated from the arm, and their corresponding contact-plates located in the resistance short-circuit when contacting as and for the purpose specified.

18. The combination with the motors, main controller and auxiliary controller, and apparatus for reversing the relation of the field to the armature, of means for forming the local circuit and an automatic regulator located in such circuit and means for breaking the local circuit and for completing the series circuit between the trolley and the ground as specified.

JAMES HARRY KEIGHLY McCOLLUM.

Witnesses:

B. BOYD,

E. McEACHERN.